United States Patent [19]

Das et al.

[11] Patent Number: 4,771,113

[45] Date of Patent: Sep. 13, 1988

[54] THERMOSETTABLE MODIFIED PHENOLIC POLYESTER IMIDE RESINS

[75] Inventors: Sajal Das, Parsippany; Dusan C. Prevorsek, Morristown, both of N.J.

[73] Assignee: Allied Corporation, Morris Township, Morris County, N.J.

[21] Appl. No.: 61,635

[22] Filed: Jun. 15, 1987

Related U.S. Application Data

[62] Division of Ser. No. 821,657, Jan. 23, 1986.

[51] Int. Cl.$^4$ .............................................. C08G 8/32
[52] U.S. Cl. .................................... 525/508; 525/502; 525/504
[58] Field of Search ....................... 525/502, 504, 508

[56] References Cited

U.S. PATENT DOCUMENTS

| | | | |
|---|---|---|---|
| 2,952,663 | 9/1960 | Wasserman et al. | 525/508 X |
| 3,481,901 | 12/1969 | Prochaska | 525/508 X |
| 3,558,560 | 1/1971 | Huck et al. | 525/508 |
| 3,817,924 | 6/1974 | Young, Jr. et al. | 525/508 |
| 3,839,264 | 10/1974 | Schmidt et al. | |
| 3,966,670 | 6/1976 | Grazen et al. | |
| 4,026,913 | 5/1977 | Tanigaichi et al. | |
| 4,041,796 | 8/1977 | Shishido | |
| 4,096,108 | 6/1978 | Webb et al. | |
| 4,157,360 | 6/1979 | Prevorsek et al. | |
| 4,218,361 | 8/1980 | Searfoss et al. | |
| 4,219,452 | 8/1980 | Littlefield | |
| 4,240,938 | 12/1980 | Kraft et al. | 525/508 X |
| 4,268,657 | 5/1981 | Manzara | |
| 4,650,838 | 3/1987 | Das et al. | 525/504 |
| 4,650,839 | 3/1987 | Das et al. | 525/504 |

FOREIGN PATENT DOCUMENTS

| | | |
|---|---|---|
| 2546290 | 4/1977 | Fed. Rep. of Germany . |
| 2549529 | 5/1977 | Fed. Rep. of Germany . |
| 58-34822 | 3/1983 | Japan . |
| 59-149918 | 8/1984 | Japan . |
| 973377 | 10/1964 | United Kingdom . |
| 1026032 | 4/1966 | United Kingdom . |
| 1070364 | 6/1967 | United Kingdom . |
| 1095663 | 12/1967 | United Kingdom . |

OTHER PUBLICATIONS

D. F. Loncrini et al., J. Polym. Sci. vol. 4, p. 440 (1966).
S. Das et al., J. Appl. Polym. Scr., vol. 26, p. 957 (1980).
R. Kubens et al., Kunst-stoffe, Bd. 58, pp. 827–832 (1968).
V. V. Korsak et al., Dokl Akad, Nauk SSSR., vol. 202, pp. 347–350 (1972).

*Primary Examiner*—Howard E. Schain
*Attorney, Agent, or Firm*—Richard C. Stewart; Richard A. Negin; Gerhard H. Fuchs

[57] ABSTRACT

Modified phenolic resins and cured resins prepared therefrom.

14 Claims, No Drawings

THERMOSETTABLE MODIFIED PHENOLIC POLYESTER IMIDE RESINS

This application is a division of application Ser. No. 821,657, filed Jan. 23, 1986.

BACKGROUND OF THE INVENTION

1. Field of the Invention

This invention relates to certain novel modified phenolic imide resins. More particularly, this invention relates to such resins which have improved properties.

2. Prior Art

Phenolic resins are a class of synthetic materials that have grow continuously in terms of volume and applications for over several decades. The building blocks used in greatest volume are phenol and formaldehyde. Other important phenolic starting materials are the alkyl-substituted phenols, including cresols, xylenols, p-tert-butyl-phenol, p-phenylphenol, and nonylphenol. Diphenols, eg, resorcinol (1,3-benezenediol) and bisphenol-A [bis-A or 2,2-bis(4-hydroxylphenyl)propane], are employed in smaller quantities for applications requiring special properties. In addition to formaldehyde, acetaldehyde or furfuraldehyde sometimes are employed but in much smaller quantities. The greater latitude in molecular structure, which is provided by varying the raw materials, chemistry, and manufacturing process, has made possible an extremely large number of applications for these products as a results of the array of physical propeties that arise from the synthetic options.

The early investigation of the reaction of phenol and formaldehyde began with the work of von Baeyer and others in the early 1870s as an extension of phenolbased dye chemistry. The initial experiments resulted in soluble, amorphous products whose properties elicited little interest. Insoluble, cross-linked products were reported in the lates 1880's, but these products also were not perceived as useful materials. In 1899, the first patent for a phenolic-resin product intended for use as a hard-rubber substitute was granted. The first commercial product was introduced as a shellac substitute by the Louis Bluner Company in the early 1900's. Process patents were issued in 1894 and 1895 for ortho- and para-methylolphenol, respectively.

Key innovations in early phenolic-resin manufacture included control of the molecular structure and the use of heat and pressure to achieve desirable physical properties in filled compositions. Studies in the use of acidic or basic catalysts and of changes int he molar ration of formaldehyde to phenol resulted in the definition of two clases of polymeric materials which are refered to as Bakelite resins. Caustic-catalyzed products, which are prepared with greater than a 1:1 mol ratio of formaldehyde to pheno, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity. Possibly of greatest importance to early commercilization, however, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mole of formaldehyde per mole of phenol. The initial reaction involved in the preparation of resolated novolaks is carried out with an acid catalyst and less than a 1:1 mol ratio of formaldehyde to phenol. After formation of the novolak, the pH is adjusted so that the reaction mixture is basis and additional formaldehyde is added. Resoles and resolated novolaks are inherently thermosetting and require no curing agent for advancement. Novolaks, by comparison, are thermoplastic and require the addition of a curing agent, the most commong being either hexamethylenetetramine or a resole. The stages of molecular weight advancement are characterized by liquid or solid phenolic polymer which is soluble in certain organic solvents and is fusible; a solid resin which is insoluble but swelled by organic solvents and, although softened by heat, exhibits essentially no flow; and an insoluble, infusible product which is not swelled by solvents nor softened by heat, ie, the system is in a highly cross-linked state.

Phenolic resins have many uses. For example, such materials are used as bonding agents in friction materials such as brake linings, clutch facings, transmission bonds and the like. For example U.S. Pat. Nos. 4,096,108; 4,268,657; 4,218,361; 4,219,453; and 3,966,670 describe various friction materials in which a phenolic resin is employed as the bonding agent. Phenolics are also used as molding materials, and as coatings and adhesives. Phenolics resins developed for nonflammability and long term temperature stability to 230° C. have been studied in carbon-fiber composites. Potential for such composites lies in advanced aircraft application.

While present day phenolics exhibit several beneficial properties they suffer from a number of disadvantages which restrict their utility. For example, such materials exhibit less than desirable thermal oxidative stability. Other major problems of present day phenolic technology include a need for auxiliary chemicals such as hexamethylene tetraamine to crosslink the phenolic which often results in the production of volatile by-products such as ammonia during crosslinking. Still other problems result from the fact that crosslinking is often extensive and is not controllable.

Various modifications to phenolics have been proposed to obviate certain of the disadvantages attendant to these resins. For example, epichlorohydrin has been reacted with the hydroxyl groups of novalak forming epoxy novalak. Moreover, n-chloro-2-propene has been reacted with the hydroxyl groups of novalak to form the corresponding form methylon resin. Similarly, Japanese patent publication Nos. 59-149918 and 58-34822 describe a method of preparing a phenolic resin containing cyanate groups. In this method, a trialkyl ammonium salt of a phenol novolak is reacted with excess cyanhalogenide in an organic solvent.

Polyesterimides are known polymeric composition compounds. For example, polyesterimides and processes for their preparation are described in Great Britain Pat. Nos. 973,377; 1.070.364; 1,026,032; and 1,095,663; U.S. Pat. No. 3,839,264; D. F. Loncrini et al., J. Polym. Sci, Vol. 4, p. 440 (1966), and S. Das et al., J. Appl. Polym. Sci., Vol. 26, p 957 (1980).

Crosslinked polymers, for example, polycyanates (crosslinked polymers) derived by the polycyclotrimerization of aromatic cyanates are known. See for example, U.S. Patent No. 4,026,913, which describes cyanic acid esters of aromatic polycarbonates which can be cured to produce crosslinked polycyanurates. Also see the references, *Kunst-stoffe*, Bd., 58, pp. 827–832 (1968)

by R. Kubens et al., and *Dokl Akad. Nauk* SSSR, Vol. 202, pp. 347–350 (1972) by V. V. Korsak et al., which describe the cyclotrimerization of aryl cuanurates and properties of crosslinked polymers derived therefrom. In addition, the refrneces, U.S. Pat. No. 4,040,796 (1977) and German Offenlegungschrifte Nos. 2,549,529; 2,546,290; and 2,541,315 describe processes for producing certain poly functional cyanic acid esters, and cured products derived therefrom.

U.S. Pat. No. 4,157,360 describes cured compositions consisting essentially of a cross-linked cyanurate polymer and a thermoplastic polymer of at least film forming molecular weight. This composition possesses a Vical softening temperature of at least about 10° C. above that of the thermoplastic polymer alone as determined by ASTM 1525; and an elongation-to-break value which is at least twice as great as that of the crosslinked polymer alone or determined by ASTM D-638 at room temperature.

SUMMARY OF THE INVENTION

One aspect of the present invention is directed to a modified phenolic reisn of Formula I:

FORMULA I

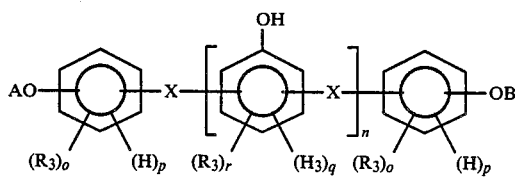

wherein:

A and B are the same or different and are moieties of the formula:

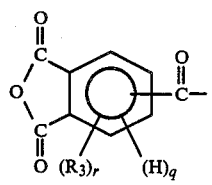

n is a positive whole number greater than or equal to 1;

q and r are the same or different at each occurence and are whole numbers from 0 to 3, with the proviso that the sum of q and r at each occurrence is equal to 3;

o and p are the same or different at each occurence and are whole numbers form 0 to 4, with the proviso that the sum of o and p at each occurrence is is equal to 4;

-x- is a divalent organic radical; and $R_3$ is the same or different at each occurrence and is a substituent other than hydrogen which is unreactive under conditions necessary to crosslink the cyanurate moieties.

Yet another aspect of this invention relates to a new phenolic resin of the Formula II:

FORMULA II

FORMULA II

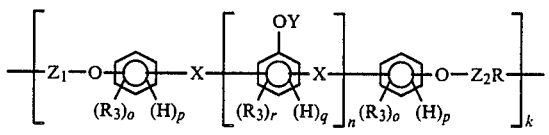

wherein $R_3$, q, r, o, p, and x are as described above, k is a positive whole number, Y is hydrogen, or hydrogen and —CN—, —r— is a divalent organic moiety, and —$Z_1$— and $Z_2$— are the same or different and are of the formula:

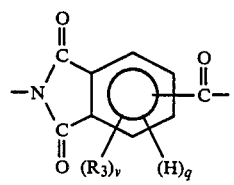

Another aspect of this invention relates to precured compositions containing the above-referenced modified phenolic resins of Formula I and Formula II, and to partially cured, completely cured and incompletely cured compositions of Formulas II formed by the curing or crosslinking of the modified phenolic resin of this invention to varying degreees. As used herein, "completely cured" modified phenolic resins are those in which less than about 20 mole percent of the original crosslinkable groups, i.e., hydroxyl or cyano, remain unreacted as determined by the method of infrared spectrophotometry; "precured" modified phenolic resins are those in which substantially about 100 mole percent of the original crosslinkable groups, i.e., hydroxyl or cyano, are unreacted as determined by the method of infrared spectrophotometry; "partially cured" modified phenolic resins are those in which from about 40 to about 70 mole percent of the original crosslinkable groups, i.e., hydroxyl or cyano are unreacted as determined by infrared spectrophotometry; and "incompletely cured" modified phenolic resins are those in which from about 40 to about 20 mole percent of the original crosslinkable groups, i.e., hydroxyl or cyano are unreacted as determined by infrared spectrophotometry. Still, another aspect of this invention relates to such compositions comprising said phenolic resin in admixture with one or more other materials as for example, thermosetting and thermoplasic polymers such as kevlar and polyethylene, fillers as for example boron, carbon, and the like.

Certain crosslinked or cured phenolic resins of this inention are formed by crosslinking the resin of Formula II wherein Y is hydrogen by treatment with a conventional phenolic crosslinking agent such as hexamethylene tetramine, resole and paraformaldehyde to provide the desired degree of curing or crosslinking. Another crosslinked or cured phenolic resin of this invention is prepared by crosslinking phenolic resin of Formula II wherein Y is a mixture of —CN and hydrogen by "polycyclotrimerization".

The cured resin derived from modified phenolic resin of this invention, and the modified phenolic resin of this invention exhibit several advantages over conventional phenolic resins. For example, certain of these materials are self crosslinking, and thus do not require auxilliary chemicals for crosslinking. Moreover, the cross-linked material has greater oxidative, mechanical and thermal stability as compared to conventional phenolic resins, and no volatile, potentially environmentally hazardous by-products are produced during crosslinking. Furthermore, the claimed crosslinked phenolic resins have higher char forming properties than the conventional phenolics and polyesterimide resins.

DESCRIPTION OF THE PREFERRED EMBODIMENTS OF THE INVENTION

One aspect of this invention relates to a phenolic esterimide resin of the Formula II wherein $R_3$, r, n, —X—, o, p, k, —$Z_1$—, —$Z_2$—, Y and —R— are as described above. In formula II, —R— is a divalent organic radical. Illustrative of useful —R— groups are alkylene as for example, methylene, 3-methoxyhexamethylene, 3-methylhexamethylene, 3-methylheptamethylene, 1,2-ethylene, 1,3-propylene, 1,10-decalene, 1,4-butylene, 1,7-heptalene, 2,2-dimethyl-1,3-propylene, 1,6-hexylene; 1,8-octalene and the like; arylene such as 1,3-phenylene, 1,4-phenylene, biphenylene, 1,3-benzenedimethylene, 1,4-benzenedimethylene, 2,2-bis-(4-phenylene)propane, 1,5-naphthalene, bis-(4-phenylene)methane, 4,4'-phenylene propane, 4,4-diphenylenedimethane and the like; and cycloalkylene such as cyclohexylene, cyclooctylene, 1,3-cyclohexanedimethylene, 1,4-cyclohexanedimethylene; and the like. Also illustrative of useful —R— groups are arylene, alkylene or cycloalkylene which may include one or more divalent oxygen, nitrogen, sulfur, sulfenyl, keto, sulfonic ester, and ester moieties as for example oxybisethylene, oxybispropylene, ethylenedioxylbisethylene, oxybisphenylene, 2,2'-diethylene sulfone, 2,2'-diethylene sulfide, 3,3'-dipropylene sulfone, 3,3'-dipropylene ether, oxybisnaphthalene, oxybiscyclohexylene, thiobisethylene, thiobisphenylene, aminobisphenylene, ammobisethylene, thiobiscyclohexylene, sulfonylbisethylene, sulfonylbisphenylene, 4,4'-phenylene ethane, 3,4'-phenylene propane, 4,4'-phenylene ether, 4,4'-phenylene sulfone, 4,4'-phenylene sulfide, sulfonylbiscyclohexylene, sulfinylbisphenylene, sulfinylbisethylene, and the like. Exemplary of useful —R— groups are alkylene terminated polydiorganosiloxanes such as bis-(3-propylene)tetra methl disiloxane, bis(4-butylene)tetra methyl disiloxanes and the like.

$R_3$ is an inert substituent. Illustrate of suitable —X— groups are such inert substituents as halogen, trihalomethyl, alkyl, alkoxyl, phenyl, an the like.

—X— is a divalent organic radical. Illustrative of suitable $R_3$ groups are alkylene such as methylene, ethylemethylene, difluoromethylene, 2-ethypentylemethylene, methylmethylene, isopropymethylene, isobutylmethylene, pentylmethylene, furylmethylene, and the like; arylene such as 1,3-benzenediamethylene, penylmethylene, 1,4-benzenedimethylene, 2,2-bis(4-phenylene)propane, 4-methoxyphenylmethylene, bis-(4-phenylene)methane, 4,4-diphenylenes dimethylethane and the like; and cycloalkylene such as cyclohexylene, cyclooctylene, 1,3-cyclohexandimethylene, and the like.

In the preferred embodiments of the invention: —R— is a divalent organic radical selected from the group consisting of divalent aromatic radicals having from 6 to about 20 carbon atoms, alkylene having from 1 to about 20 carbon atoms, cycloalkylene having from 3 to about 20 carbon atoms. polydiorganosiloxanes terminated with alkylene having from about 2 to about 8 carbon atoms, and divalent radicals of the formula:

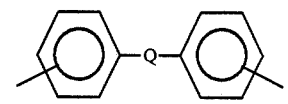

wherein Q is selected from the group consisting of:

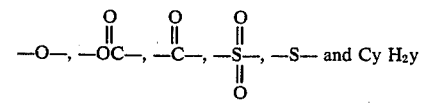

where y is from 1 to about 20.

q and r are the same or different and are positive whole numbers from 0 to 3, with the proviso that the sum of q and r at each occurrence is 3;

Y is hydrogen, or hydrogen and —CN with the proviso that when Y is hydrogen and —CN is from about 5 to about 80 mole percent of Y is —CN;

o and p are the same or different and are positive whole numbers from 0 to 4, with the proviso that the sum of o and p at each occurrence is 4;

—X— is substituted or unsubstituted methylene or 1,4-phenyldimethylene wherein permissible substituents are alkyl, halogen or furyl;

k is is a positive whole number from 1 to about 25;

$R_3$ is alkyl; and n is a positive number from 1 to about 10.

Amongst the preferred embodiments most preferred are those embodiments of the above formula in which:

0 is 0 or 1;

pis 3 to 4;

—X— is methylene, methylene substitued with alkyl having from about 1 to about 10 carbon atoms, halogen, furfuryl and xylene;

$R_3$ is methyl or ethyl;

n is 1 to about 6;

k is 1 to about 15;

Y is hydrogen, or hydrogen and —CN with the proviso that when Y is hydrogen and —CN from about 15 to about 75 mole percent of Y is —CN;

—R— is a divalent radical selected from the group consisting of divalent aromatic radical and divalent radicals of the formula:

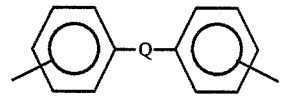

r is 0 or 1; and q is 2 to 3.

Amongst these particularly preferred embodiments, most preferred are those embodiments wherein;

k is 1 to about 5;

n is 1 to about 4;

p is 4 o is 0;

Y is hydrogen, or hydrogen and —CN with the proviso that when y is hydrogen and —CN from about 25 to about 50 mole percent of Y is —CN;

r is 0;

—R— is selected from the group consisting of phenylene, diphenylene, naphthalene and divalent radicals of the formula:

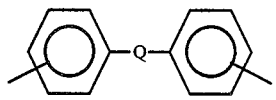

where Q is selected from the group consisting of

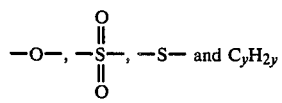

where y is from 1 to about 10;
—X— is a moiety of the formula:

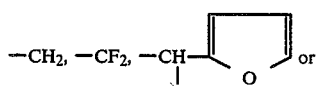

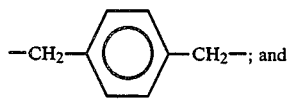

q is 3.

The phenolic resin of Formula II in which Y is hydrogen and —CN is prepared by treating the phenolic imide resin of Formula II in which Y is hydrogen with a cyanurating agent such as a cyanogen halide, preferably cyanogen chloride or cyanogen bromide until the desired amount of cyannate groups are formed, generally at least about 10 mole % of the Y groups. In the prefered embodiments of the invention sufficient cyanurating agent is used such that from about 5 to about 80 mole percent of Y groups are —CN and in the particularly preferred embodiments, from about 15 to about 75 mole percent of the Y groups are —CN. Amongst these particular preferred embodiments most preferred are those embodiments in which sufficient cyanurating agent is used such that from about 25 to about 50 mole percent of the Y groups are —CN. Methods of forming cyanurate groups are well known in the art and will not be described herein in any great detail. Briefly stated in this is a nucleophilic displacement reaction in which a cyanogen halide, preferably chloride or cyanogen bromide is reaced with the phenolate of the resin of Formula II wherein the required percentage of Y hydrogen groups have been displaced by an acid acceptor solvent. The phenolate is formed by reacting the resin of Formula II wherein Y is hydrogen with an acid acceptor solvent as for example, a tertiary amine such as triethylamine, in an amount sufficient to displace the desired quantity of Y hydrogen groups. Reaction parameters can vary widely. The reaction is usually carried out over a period of from about 4 to about 6 hours at atmospheric pressure and a temperature of from about 0° C. to about 120° C. in an aprotic solvent, such as N-methyle pyrrolidone, dimethyl sulfoxide and N,N-dimethyl formamide.

The phenolic imide of Formula II in which Y is hydrogen is prepared by reacting the phenolic anhydride of this invention depicted in Formula I with a diamine of the formula:

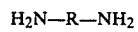

where o, p, k, n, —X—, R$_3$, q, r, and —R— are as described above, followed by imidization of the reaction mixture. This reaction is carried out by reacting appropriate amounts of reactants neat at room temperature and at autogenous pressure.

Imidization may be performed either chemically or thermally. Methods of imidization are well known in the art and will not be described herein in any great detail. The thermal imidization can be conducted by adding acetic anhydride and toluene and removing reaction solvent/toluene by distillation. The distillation addition cycle can be carried out for 2-4 hours during which time the solid content of reaction is maintained at an appropriate level, as for example at 10-15 percent.

The chemical imidization can be carried out by use of a mixture of equal molar ratio of acetic anhydride and pyrdine. The mixture of acetic anhydride and pyridine is poured into polyamic acid solution, and the imidization is allowed to proceed overnight at room temperature.

The modified phenolic resin of the invention depicted in Formula I used as a precursor in the preparation of the resin of Formula II is prepared by a condensation polymerization reaction. In this reaction, an acyl substituted aromatic compound of the formula:

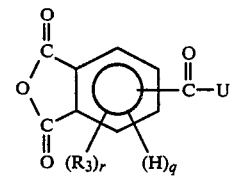

in which R$_3$, n, p, and q are as defined above, and U is a leaving group such as fluoro, chloro or bromo is reacted with phenolic of the formula:

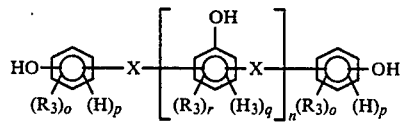

wherein R$_3$, —X—, q, r, o, p and n are as defined above preferably under nitrogen in an aprotic solvent and in the presence of an acid acceptor such as a tertiary amine as for example triethylamine.

Reaction temperatures can vary widely and are preferably from about 0° C. to about 120° C. with agitation and more preferably from about 0° C. to about 30° C. Reaction pressures can vary videly. However, for convenience, the reaction is carried out at autogenous pressure.

Useful aprotic solvents can vary widely, the only requirement being that the solvent is inert under the reaction conditions. Illustration of aprotic solvents useful in the conduct of this reaction are N,N-dimethyl acetamide, N,N-dimethyl formaminde, N-methyl-2 pyrrolidone, and dimethyl sulfoxide. The preferred solvent is N-methyl 2-pyrrolidone.

Reaction times can vary considerably and will depend upon such factors as the degree of agitation, temperature, nature and proportion of reactants and the like. Preferred reaction times are from about 4 hours to about 6 hours.

The reaction product can be recovered by conventional means. For example, the crude polymeric product can be recovered by pouring the reaction mixture into water. The final polymer can be reprecipitated by standard technique such as redissolving in N-methyl, 1,2-pyrrolidone and reprecipitating from water. the product can then be dried in vacuum oven for 24 hr.

The acyl substituted aromatic compounds and the phenolic resins used in the preparation of the modified phenolic resins of this invention are known materials, which can be obtained commercially or prepared by known procedures. For example, phenolic resins can be conveniently prepared by reacting an aldehyde such as formaldehyde and a phenol such as phenol int he presence of an acid or base catalyst, and acyl substituted aromatic compounds can be prepared by reacting an appropriate trimellitic acid anhydride with a halogenating agent such as thionyl chloride.

The phenolic resin of this invention as depicted in Formula II can be crosslinked or cured to form various partially cured, incompletely cured and completely cured resins. One partially cured, incompletely cured or completely cured resin is prepared by treating the phenolic resin of Formula II in which Y is hydrogen with a conventional crosslinking agent such as hexamethylene tetra amine, paraformaldehyde and resole. Suitable crosslinking reaction parameters are described in more detail in U.S. Pat. Nos. 4,096,108; 4,219,452; 4,218,361 and 4,268,657; and G. L. Brode, "Phenolic Resins", in Encyclopedia of Chem. Tech., 3rd Ed., Vol. 17, p. 384 (1982) which are incorporated herein by reference.

Another partially, incompletely and completely cured resin is formed by subjecting the resin of Formula II in which Y is hydrogen and —CN to polycyclotimerization. By the term "polycyclotrimerization" is meant forming a cyanurate ring system by the polymeric condensation of three aromatic cyanate groups to form the crosslinked aromatic ring system of the formula:

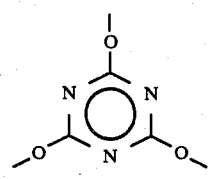

Methods for conducting the polycyclotrimerization of cyanurate compounds are well known in the art and include annealing above about 200° C. For example, such procedures are described in U.S. Pat. No. 4,157,360 and Kunstoffe, Bd., 58, pp. 827-832 (1968) by R. Kubens et al. and Kokl, and Akad Naak SSSR, Vol. 202, pp. 347-350 (1972) by V. V. Korshak et al., which are hereby incorporated by reference.

A reinfored and/or filled compositions comprising the completely cured, partially cured, and incompletely cured compositions of this invention, and the precured compositions of Formula I and II which may be used in the preparation of such reinforced compositions are also part of the invention disclosed herien. The completely cured, precured, partially cured, and incompletely cured compositions as described, may contain fillers for use in where the structural strength and integrity of a structure has to be maintained, and for other purposes known to those of skill in the art. Any suitable filler known to those of skill in the art can be used. Such fillers may be selected from a wide variety of organic and nonorganic materials such as polymers, minerals, metals, metal oxides, siliceous materials and metal salts. Illustrative of useful fillers are fiber glass, steel, abestos fibers, aramide, boron and carbon fibers, as well as plate like, fibrous and particulate forms of alumina, bross powder, aluminum hydrates, iron oxide, feldspar, lead oxides, asbestos, talc, barytes, calcium carbonates, clay, carbon black, quartz, novaculite and other forms of silica, kaolinite, aluminum silicate bentonite, garnet, mica, saponite, beidelite, calcium oxide, fused silica, calcium hydroxide, etc. Other useful fillers include thermoplastic polymer as for examplepolyesters, polyimides, polyamides, polysulfones, polyaramids, polyester carbonates, polyethers, polyethersulfones, polyethylene, polypropylene, polycarbonates, polyetherimides, polysulfides, polyacrylates, polyvinyls and the like. The foregoing recited fillers are illustrative only and are not meant to limit the scope of the fillers that can be utilized in this invention. Methods for producing reinforced and/or filled compositions include melt vending, extrusion and molding processes, simple mixing and dispersion for both materials in a suitable medium by methods known in the art.

The precured, completely cured, incompletely cured and partially-cured compositions of this invention are useful in forming a wide variety of industrial products, including shaped articles, as produced by known shaping processes. Precured compositions can be formed (i.e., shaped) into articles which can then be cured to form completely cured, incompletely cured and partially-cured articles. Shaped articles produced from the polymer composition include windscreens such as windshields, structural parts, canopies, door windows wire housing and the like. The shaping process can be any process known to one skilled in the art, such as injection, blow or extrusion molding. Another use of the crosslinked polymer of the member is a binding agents in the manufacture of friction materials such as brake linings, clutch facings and transmission bands, as for example those described in U.S. Pat. Nos. 3,966,670, 4,268,657, or 4,281,361. Still other uses of the polymers of this invention are molding materials, composites for use in the manufacture of structural parts and the like.

The following specific examples are presented to more particularly illustrate the invention and are not to be construed as limitations thereon.

EXAMPLE 1

A 5 g quantity of RD-27 (a novalac resin) was dissolved in a mixture of 50 ml N-methyl 2-pyrolidone and 10 ml of pyridine. The mixture was stired for 20 minutes, while 2.8 g of trimellitic acid anhydide chloride was dissolved in 25 ml of N-methyl 2-pyrrolidone and added slowly to the above mixture. The reaction was continued with stirring under nitorgen for 3 hours. Oxydianiline (2.6 g) was dissolved in N-methyl 2-pyrolidone and added to the above mixture. A exotherm was noticed (25°-28° C.), the reaction was continued for 2½ hours. The imidization was conducted by adding 5 ml of acetic anhydride and removing N-methyl 2-pyrrolidone/toluene by distillation. The distillation addition cycle was carried out for 2 hours during which time about 100 ml of N-methyl 2-pyrolidone/toluene mixture was collected. The product was poured into 300 ml of vigorously stirred water. The polymer that precipitated was filtered and poured into 300 ml of acetone to remove inpurities. The polymer was dried under vaccun oven at 100° C. for 24 hour.

EXAMPLE 2

A poly p-xylene phenolic (3 g) was dissolved in a mixture of 25 ml N-methyl 2-pyrolidone and 10 ml of pyridine. Trimellitic acid anhydride chloride (2.5 g) was dissolved in 15 ml of N-methyl 2-pyrolidone and added slowly to the phenolic solution. As the addition was completed, the color of the solution change from dark to orange. The reaction was continued for 3 hours. A Oxydianiline (2.3 g) was then dissolved in 15 ml of N-methyl 2-pyrolidone and added to the above mixture. After the addition of the oxydianailine, the reaciton was contined for 2½ hours. The mixture was chemically imidized by the addition of 10 ml of acetic anhydride, allowed to sit overnight. The reaciton mixture was poured into water, and the polymer that precipitated, was filtered and poured into 300 ml of acetone to remove impurities. The polymer was dried under vacuum oven at 100° C. for 24 hours.

EXAMPLE 3

Five grams of Novalac of number average molecular weight-620 was dissolved in 50 ml of N-methyl 2-pyrolidone and 10 ml of pyridine. The mixture was stirred for 1 hr while 2.8 g of trimellitic acid anhydride chloride was dissolved in 25 ml of N-methyl pyrrolidone and added slowly tot he above mixture. The reaction was continued with stirring under nitrogen for 3 hours. 4,4'-Diamino-diphenylmethane (MDA) (2.6 g) was added to the mixture and reaction was run for 3½ hours. The mixture was chemically imidized by addition of 10 ml of $AC_2O$ and imidization was continued overnight. The reaction mixture was poured into water and filter. The light-yellow product was dired in vacuum overnight at 110° C.

EXAMPLE 4

Two grams of phenolic-polyester imide from Example 3 was dissolved in 15 ml N-methyl 2 pyrolidone and few drops of triethylamine was added to the mixture. Cyanogen bromide (1g) was dissolved in 5 ml of NMP and added to the phenolic solution. The reaction was continued for 2 hours. The product was then isolated by precipitating in water. A light-yellow product resulted. The polymer was dried under vacuum over night at 100° C. for 24 hours.

EXAMPLE 5

A series of experiments were carried out for the purpose of evaluating the thermal characteristics of certain embodiments of this invention and to compare same to the base phenolic resin. In these experiments, thermogravimetric anaylsis (TGA) was carried out in an argon atmosphere to determine the weight loss of a sample as a function of temperature and the % Char at 900° C. These experiments were carried out using a Dupont-1090 thermogravimeter at a heating rate of 10° C./min. The typical sample size was 30-34 mg. The results of these experiments we set forth in the following Table I.

TABLE 1
Thermal Characterization of Phenolic-Polyesterimide System

| Sample | % Weight Loss at °C. | | | | | | % Residue at 900° C. | Differential Scanning Colorimetry Tg °C. |
|---|---|---|---|---|---|---|---|---|
| | 100 | 200 | 300 | 400 | 450 | 500 | | |
| RD-27 (Novolac) | 0.2 | 0.6 | 4.1 | 26.4 | 34.6 | 38.6 | 44.8 | 60 |
| Ex 1. | 0 | 0 | 2.2 | 8.0 | 14.2 | 26.4 | 52 | 104 |
| Ex 2. | 0 | 1.1 | 3.1 | 8.0 | 11.3 | 17 | 49 | — |
| Poly p-xylene phenolic (xylok) | 0 | 7.2 | 14.6 | 18 | 23.8 | 30.8 | 36 | 23 |
| Ex 3. | 0 | 0 | 0 | 2.0 | 3.0 | 11.0 | 50 | — |

What is claimed is:

1. A modified phenolic reisn of the formula:

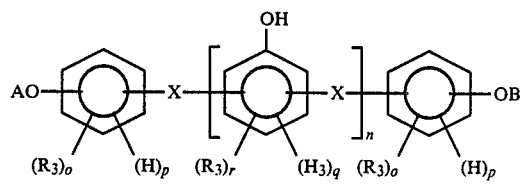

wherein:

A and B are the same or different and are aromatic moieties of the formula:

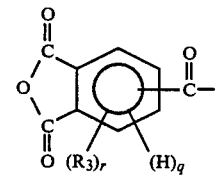

o and p are the same or different at each occurrence and are whole numbers' form 0 to 4, with the proviso that the sum of o and p at each occurrence is equal to 4;

q and r are the same or different and are whole numbers from 0 to 3 witht he proviso that the sum of q and r at each occurrence is equal to 3;

—X— is a divalent organic radical;

$R_3$ is the same or different at each occurrence and is a substituent other than hydrogen which is unreactive with amine functions; and n is a positive whole number of at least about 4.

2. A resin according to claim 1 wherein A and B are the same.

3. A resin according to claim 1 wherein:

o and p are the same or different and are numbers from 0 to 3 with the proviso that the sum of o and p is 3.

4. A resin according to claim 3 wherein:
o is 0 to 1; and
p is 1 to 3.

5. A resin according to claim 4 wherein:
p is 3; and
o is 0.

6. A resin according to claim 1 wherein X is substituted or unsubstituted methylene or 1,4-phenyldimethylene, wherein permissible substituents are alkyl having from 1 to about 10 carbon atoms and furyl.

7. A resin according to claim 6 wherein X is a moiety of the formula:

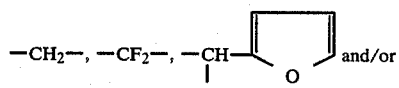 and/or

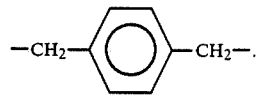

8. A resin according to claim 1 wherein n is from about 4 to about 10.

9. A resin according to claim 8 wherein n is about 4.

10. A resin according to claim 1 wherein:
q and r are the same or different and are positive numbers from 0 to 3, with the proviso that the sum of q and r is 3.

11. A resin according to claim 10 wherein:
r is 0 or 1; and
q is 1 to 3.

12. A resin according to claim 11 wherein:
o is 0; and
p is 3.

13. A resin according to claim 1 wherein $R_3$ is alkyl.

14. A resin according to claim 13 wherein $R_3$ is methyl or ethyl.

* * * * *

UNITED STATES PATENT AND TRADEMARK OFFICE
CERTIFICATE OF CORRECTION

PATENT NO. : 4,771,113

DATED : September 13, 1988

INVENTOR(S) : S. Das et al.

It is certified that error appears in the above-identified patent and that said Letters Patent is hereby corrected as shown below:

```
Col. 1, line 15:    "grow" should read -- grown --.
        line 51:    "int he" should read -- in the --.
        line 53:    "clases" should read -- classes --.
        line 56:    "pheno" should read -- phenol --.
        line 63:    "commercilization" should read
                    -- commercialization --.
Col. 2, line 6:     "basis" should read -- basic --.
        line 61:    "p 957" should read -- p. 957 --.
Col. 3, line 26:    "reisn" should read -- resin --.
Col. 4, line 14:    " -r- " should read --  -R-  --.
Col. 5, line 55:    "ethylemethylene" should read
                    -- ethylmethylene --.
        line 55-56: "2-ethypentylemethylene" should read
                    -- 2-ethypentylmethylene --.
```

UNITED STATES PATENT AND TRADEMARK OFFICE
CERTIFICATE OF CORRECTION

PATENT NO.   : 4,771,113

DATED        : September 13, 1988

INVENTOR(S)  : S. Das et al.

It is certified that error appears in the above-identified patent and that said Letters Patent is hereby corrected as shown below:

| | |
|---|---|
| Col. 5, line 59: | "penylmethylene" should read -- phenylmethylene --. |
| Col. 7, line 43: | "A mongst" should read -- Amongst --. |
| line 53: | "reaced" should read -- reacted --. |
| line 65: | "methyle" should read -- methyl --. |
| Col. 8, line 66: | "formaminde" should read -- formamide --. |
| Col. 9, line 19: | "int he" should read -- in the --. |
| line 58: | "Kokl" should read -- Dokl --. |
| line 61: | "reinfored" should read -- reinforced --. |
| line 66: | "herien" should read -- herein --. |
| Col. 10, line 26: | "vending" should read -- blending --. |
| Col. 11, line 34: | "oxydianailine" should read -- oxydianiline --. |
| Col. 12, line 55: | "form" should read -- from --. |
| line 59: | "witht he" should read -- with the --. |

Signed and Sealed this

Fourth Day of April, 1989

Attest:

Attesting Officer

DONALD J. QUIGG

Commissioner of Patents and Trademarks